United States Patent
Helot et al.

(10) Patent No.: US 11,932,108 B2
(45) Date of Patent: Mar. 19, 2024

(54) DISPLAY DEVICE AND VEHICLE INCLUDING THE DISPLAY DEVICE

(71) Applicant: AUDI AG, Ingolstadt (DE)

(72) Inventors: Jacques Helot, Ingolstadt (DE); Ulrich Mueller, Ingolstadt (DE); Immo Redeker, Ingolstadt (DE); Joris Mertens, Ingolstadt (DE); Michael Herter, Eichstaett (DE); André Georgi, Eching (DE)

(73) Assignee: AUDI AG, Ingolstadt (DE)

( * ) Notice: Subject to any disclaimer, the term of this patent is extended or adjusted under 35 U.S.C. 154(b) by 332 days.

(21) Appl. No.: 17/295,322

(22) PCT Filed: Nov. 25, 2019

(86) PCT No.: PCT/EP2019/082420
§ 371 (c)(1),
(2) Date: May 19, 2021

(87) PCT Pub. No.: WO2020/126328
PCT Pub. Date: Jun. 25, 2020

(65) Prior Publication Data
US 2022/0016978 A1 Jan. 20, 2022

(30) Foreign Application Priority Data
Dec. 19, 2018 (EP) .................................... 18213791

(51) Int. Cl.
*B60K 35/00* (2006.01)
*G07C 1/30* (2006.01)

(52) U.S. Cl.
CPC ................ *B60K 35/00* (2013.01); *G07C 1/30* (2013.01); *B60K 2370/1523* (2019.05);
(Continued)

(58) Field of Classification Search
None
See application file for complete search history.

(56) References Cited

U.S. PATENT DOCUMENTS

| 2016/0023665 | A1 | 1/2016 | Sherony et al. | |
| 2018/0088887 | A1* | 3/2018 | LeBlanc | G06F 3/1431 |
| 2018/0188531 | A1* | 7/2018 | Dubey | H10K 59/50 |

FOREIGN PATENT DOCUMENTS

| CN | 102481850 A | 5/2012 |
| CN | 107351763 A | 11/2017 |

(Continued)

OTHER PUBLICATIONS

Extended European Search Report dated Jun. 21, 2019, in European Patent Application No. 18213791.9 (8 pages).
(Continued)

*Primary Examiner* — Christopher Braniff
(74) *Attorney, Agent, or Firm* — STAAS & HALSEY LLP

(57) ABSTRACT

A display panel with a first panel side and a second panel side is included in a display device. The display panel displays at least one graphic display object. The display panel includes a first layer which is a pixel matrix and a second layer which includes a plurality of predetermined primary subareas. The display device includes control circuitry to enable the displaying of the graphic display object based on a predefined display alignment in one of a first orientation and a second orientation. The control circuitry adjusts a respective light transmission to a predetermined individual degree for each of the predetermined primary subareas independent of each other based on a physical environment condition.

20 Claims, 9 Drawing Sheets

(52) U.S. Cl.
CPC .......... *B60K 2370/1526* (2019.05); *B60K 2370/1868* (2019.05); *B60K 2370/52* (2019.05); *B60K 2370/785* (2019.05)

(56) References Cited

FOREIGN PATENT DOCUMENTS

| | | |
|---|---|---|
| DE | 102 38 531 | 3/2004 |
| DE | 20 2015 003 921 | 9/2015 |
| DE | 10 2018 206 656 | 10/2019 |
| EP | 2 985 571 | 2/2016 |
| EP | 2985571 B1 * | 12/2018 |

OTHER PUBLICATIONS

International Patent Application No. PCT/EP2019/082420, filed Nov. 25, 2019, Jacques Helot, Audi AG.
European Patent Application No. 18213791.9, filed Dec. 19, 2018, Jacques Helot, Audi AG.
International Search Report (Form PCT/ISA/210); dated Jan. 27, 2020 in corresponding PCT Application No. PCT/EP2019/082420 (3 pages).
Written Opinion (Form PCT/ISA/237); dated Jan. 27, 2020 in corresponding PCT Application No. PCT/EP2019/082420 (6 pages).
International Preliminary Report on Patentability (Form PCT/IB/373); dated Jun. 16, 2021 in corresponding PCT Application No. PCT/EP2019/082420 (7 pages).
Chinese Office Action issued in counterpart Chinese Application No. 201980084647.8 dated Nov. 22, 2023.

* cited by examiner

DISPLAY DEVICE AND VEHICLE INCLUDING THE DISPLAY DEVICE

CROSS-REFERENCE TO RELATED APPLICATIONS

This application is a U.S. national stage of International Application No. PCT/EP2019/082420, filed on Nov. 25, 2019. The International Application claims the priority benefit of European Patent Application No. 18213791.9 filed on Dec. 19, 2018. Both International Application No. PCT/EP2019/082420 and European Patent Application No. 18213791.9 are incorporated by reference herein in their entirety.

BACKGROUND

Described herein is a display device and a vehicle with such a display device. The display device is designed to display at least one graphical display object on two opposite sides of a display panel for presenting information to persons inside and outside of the vehicle.

Nowadays a display device has become an integral part of a vehicle. The display device usually includes a display panel (with or without touch screen functionality) which usually functions as a user interface. This enables a user, who can be the driver of the vehicle, to communicate with and/or to operate other devices in the vehicle remotely by use of the display panel or the touch screen. In this way, operating functions or driver assistance functions of the other devices of the vehicle can be made available to the user for selection. Usually, display devices are integrated within a dashboard or within a central console of the vehicle. With an increasing number of operating and comfort functions available for the user in the vehicle, it is necessary on one hand to enable a simplified operation of these functions and on the other hand to present a multitude and/or different types of information in a clear and understandable manner to the user. Furthermore, it would be of advantage if the user and/or the vehicle could communicate with other persons outside the vehicle by use of the display panel. However, space restrictions in a vehicle make it difficult to integrate an extra display panel for such a functionality. Furthermore, putting a display device at the exterior of the vehicle makes it vulnerable, since it is easily damaged and is more exposed to very high or very low temperatures making it tougher to display well. Moreover, snow and/or rain can block display content of the display panel.

German Patent Application No. 20 2015 003 921 U1 describes a head-up display, which can reflect a variety of information to the outside by diverting the projection. This diverting can be adjusted by the driver of the vehicle as required. However, the head-up display can only be used to reflect a variety of information outside.

U.S. Patent Application Publication No. 2018/0088887 A1 describes systems, apparatuses, and methods for trusted vehicle messaging that may include receiving a communication from one or more of an internal vehicle component or an external communication system and composing a trusted message to be displayed in response to the received communication. Content may be managed to be displayed on one or more displays supported by a body of a vehicle. However, the displays can communicate only in one direction, that is to the outside.

German Patent Application No. 102 38 531 A1 describes a display device having a display panel with variable optical elements for image generation and for arrangement inside the vehicle so that the vehicle's path or operating elements in the vehicle can be seen through the display panel. The display panel is pivotable out of the direction of view from the driver to the vehicle's path or operating elements. However, a display of information towards the outside is not disclosed.

SUMMARY

Described herein is a display device for a vehicle which provides a display of display contents for a user inside the vehicle as well as for a user outside the vehicle and enables the display device to be integrated in the vehicle in such a manner that only a small perceived space in an interior room of the vehicle is occupied by the display device and is protected from the outside.

This may be accomplished by the display device and the vehicle having the display device described herein. Advantageous developments with convenient and non-trivial further embodiments are specified in the following description and the drawings.

In order to ensure a two-sided display of information with low requirement of space, the display device includes a display panel with a first panel side and a second panel side, wherein the display panel allows an adjustable degree of light transmission. In other words, the display panel can be turned more transparent. The display panel is designed to display at least one graphic display object, for example, a logo and/or a user interface of an app (software application). The display panel includes a first layer on the first panel side and a second layer on the second panel side, wherein the first layer is a pixel matrix, wherein in a respective non-actuated state each pixel element is transparent. Moreover, a grid between the pixel elements is opaque resulting in a semi-transparent appearance, which in the presence of a bright backlight will appear transparent. Furthermore, the display device includes a control circuitry, wherein the control circuitry is designed to actuate at least one pixel element of the pixel matrix for displaying the at least one graphic display object. Furthermore, the at least one graphic display object includes a predefined display alignment, such that a user is able to perceive the at least one graphic display object. By the term perceive, it is meant that the user is able to view, read and understand the at least one graphic display object. For example, an English text message has a predefined display alignment from left to right, in order to be perceivable by the user. In a case, when the at least one graphic display object is an image, e.g. an icon, the display alignment can be defined by a data file in which the pixel data of the image are stored. As such, the data file defines which part of the image is to be displayed on the left side and which one on the right side.

The first layer can be designed as a transparent screen with transparent organic light emitting diodes (TOLED) and the second layer can be a so called polymer dispersed liquid crystal (PDLC) or a thin-film transistor screen (TFT) or a dynamic scattered liquid crystal (DSLC) or a suspended particle device (SPD) or a monochrome transparent segmented liquid crystal device. It is to be noted that PDLC, DSLC, SPD, TFT screens are all not light emitting and can display a color or a grey tone but cannot emit light. Such screens function when there is a backlight, since they are not perceivable in the dark. However, other technologies known to a person with ordinary skill in the related field can be used as the first layer of the display device. In the respective non-actuated state, each pixel element of the first layer remains transparent. If at a point of time, the graphic display object is needed to be displayed on a particular location on the display panel, then the control circuitry can activate a plurality of pixel elements at that particular location, which can in turn enable the plurality of pixel elements of that particular location on the first layer of the display panel to radiate a monochromatic light or a light of various colors corresponding to the graphic display object. The output of the at least one graphic display object may be requested by a first control signal that may be received by the control circuitry. However, the other pixel elements corresponding to a non-activated state and hence, remain transparent. This can enable the rest of the first layer, which is not occupied by the at least one graphic display object to remain transparent.

The display panel includes the second layer which includes a total surface area of the same size or at least 80% of the size of the first layer and can be attached to the first layer by a mechanical device or glued or laminated, which can be chosen by a person with ordinary skill in the related field. The second layer includes a plurality of predetermined primary subareas each having an adjustable degree of light transmission. The primary subareas can be for example, in a quadrilateral and/or a triangular and/or a polygonal shape. Moreover, the primary subareas can be of different shapes distributed over the entire surface area of the second layer. The primary subareas can be arranged in such a manner, that they are distributed over the entire surface area of the second layer. The primary subareas of the second layer can be designed to allow a transmission of electricity or are electrically conductive. In order to achieve an adjustable degree of light transmission, a voltage difference can be enabled across each of the primary subareas. This can enable a transformation of each of the primary subareas from a transparent state to an opaque state depending on the degree of the voltage difference across that particular primary subarea. For example, in the case of PDLC or DSLC as a technology for the subareas, it is possible to achieve different degrees of transparency dynamically by adjusting the voltage difference.

The control circuitry is adapted to adjust a respective light transmission to a predetermined individual degree for each of the plurality of the predetermined primary subareas of the second layer independent of the remaining respective primary subareas. In other words, in order to transform or adjust a particular primary subarea from a transparent state to an opaque state or in between the transparent state and opaque state, as in the case of PDLC or DSLC, or to adjust the predetermined degree of light transmission to a particular primary subarea, the control circuitry can adjust a voltage difference across the particular primary subarea in such a manner, that the particular primary subarea is transformed to the opaque state as per requirement. This can be done in such a manner, that the other remaining primary subareas remain unaltered and remain in the transparent state. The degree of light transmission can be requested by a second control signal. For example, a particular predetermined region of the second layer can be located behind the pixel matrix of the first layer. The degree of light transmission of the particular predetermined region of the display panel can be adjusted by the control circuitry, such that the respective predetermined region can be adjusted between a transparent state, in which the degree of light transmission for example is at least 40 percent and/or at least 50 percent and/or 60 percent and/or 70 percent and/or 80 percent and in an opaque state, in which the light transmission is less than 30 percent and/or less than 20 percent and/or less than 10 percent. In the transparent state, a room and/or an environment corresponding to the field of vision of the user behind the display panel (i.e. a user on the second panel side) can thus be visible through the display panel in the predetermined primary subareas which are in the transparent state. In a transparent state, for example with 50 percent of light transmission and with enough light from the outside, the display panel may look quite transparent. In other words, the user of the vehicle can perceive as if there may be almost no display panel in front of the user, this enables the user to perceive a larger interior space inside the vehicle, which in turn enables the user to feel freer or less cramped. Furthermore, when the user is driving the vehicle manually, the user is then less distracted by the display panel in the transparent state than if the display panel were to appear in the opaque state. Hence, the user can perceive a larger space in the interior room of the vehicle and is not distracted due to the presence of the display panel in front of the user.

In order to display the at least one graphic display object at a particular region on the display panel, the primary subareas of the second layer corresponding to that particular region that needs to be occupied by the at least one graphic display object can be transformed to an opaque state, if visibility of the at least one graphic display object is only required for the first panel side. The pixel elements, for example of the transparent OLED, of the first layer lying above the primary subareas in the opaque state are activated by the control circuitry so that the transparent OLEDs radiate colors according to the requirement of the at least one graphic display object. Hence, a display of the at least one graphic display object on the particular region on the display panel is enabled by use of the control circuitry.

Furthermore, aspects of the disclosure are based on a realization to solve a problem of communicating with a user or a plurality of persons outside the vehicle without resorting to a second display panel, that displays towards the outside of the vehicle, for example through the windscreen. According to the display device described herein, the control circuitry is adapted to enable the displaying of the at least one graphic display object in accordance with the predefined display alignment in one of a first orientation and a second orientation. For example, an English text message (with its predefined display alignment pointing from left to right) can be presented in the perceivable first orientation or in a horizontally mirrored second orientation. In the first orientation, the at least one graphic display object is perceivable on the first panel side in the predefined display alignment. In other words, the at least one graphic display object in the first orientation includes the predefined display alignment, such that the user or a plurality of persons sitting inside the vehicle can be able to perceive the at least one graphic display object displayed on the first panel side of the display panel. Regarding the above example of the English text message, this text would be readable from left to right from inside the vehicle.

However, if the at least one person on the second panel side of the display panel, that is outside the windscreen of the vehicle, is to be able to perceive the at least one graphical display object, which in this case is the English text (with its predefined display alignment pointing from left to right), then the at least one graphic display object is displayed in the second orientation by the first layer and the primary subareas corresponding to the at one least graphical display object are turned transparent, so that the at least one person on the second panel side can be able to perceive the at least one graphic display object with the predefined alignment.

The selection of an orientation, that is the first orientation or the second orientation, in the predefined display alignment may be requested by a third control signal that may be received by the control circuitry. In other words, on the basis of the third control signal, the control circuitry may enable the selection of the first orientation and or the second orientation in the respective predefined alignment of the at least one graphic display object, that is to be displayed on a respective predetermined location of the display panel. Based on the selection of the orientation of the graphic display object to be displayed, the graphic display object may be outputted by the actuation of the plurality of pixel elements corresponding to the predetermined location on the first panel side by the control circuitry, as per the first control signal. Furthermore, in order to ensure a clear viewability, the degree of light transmission of the plurality of primary subareas that are covered by the graphic display object is reduced to the opaque state, as per the second control signal. Furthermore, this ensures that the displayed graphic display object in the first orientation is not displayed outside, hence, not viewable to the user or the at least one person outside the vehicle, since the at least one graphic display object is covered by the corresponding plurality of primary subareas that are adjusted to the opaque state.

The control circuitry is designed to estimate a physical environment condition, as signaled by an electronic control unit. In other words, the electronic control unit, for example of a vehicle, can communicate with a backend server unit and determine the predefined physical environment condition. The predefined physical environment condition can be, for example, a weather condition. The electronic control unit can additionally or alternatively communicate with a GPS unit and determine the predefined physical environment condition, for example, the location of the vehicle with the display device.

Furthermore, the control circuitry is designed to adjust a respective light transmission to a predetermined individual degree for each of the plurality of the predetermined primary subareas independent of each of the other primary subareas in accordance with the estimated physical environment condition and/or in accordance with the orientation of the at least one graphic display object to be displayed. This is of advantage, because this can enable a display of a selected form of information represented by the at least one graphic display object in dependence with the predefined physical environment condition. The predefined physical environment condition can be, for example, a weather condition and/or location of the display device.

Furthermore, based on the estimated physical environment condition, the control circuitry is adapted to display the at least one graphic display object in the second orientation, such that the at least one graphic display object is perceivable from the second panel side in the predefined display alignment. In other words, on the basis of the third control signal, the control circuitry may enable selection of the second orientation in the predefined display alignment of the at least one graphic display object, that is to be displayed on a predetermined location of the display panel. For example, the graphic display object can be a text message which is to perceivable as "XY" by a user outside the vehicle, that is from the second panel side. The text message "XY" can be outputted as a mirrored image "YX" by the activation of the corresponding pixel elements of the first layer on the first panel side of the display panel, so that when viewed by the user from outside the vehicle, the outputted text message is perceived as "XY". Furthermore, in order to ensure a viewability of the graphic display object, which in this case is the text message "XY", from outside the vehicle, that is through the second panel side, the degree of light transmission of the plurality of primary subareas that cover by the graphic display object may be increased to the transparent state, as per the second control signal. Furthermore, since the environment of an interior room of the vehicle is usually dark, a dark background for the display panel can be ensured. This can enable a clear display of the at least one graphic display object, which is displayed in the second orientation and is perceivable by the user or the plurality of persons outside the vehicle from the second panel side, for example through the windscreen. Furthermore, such a display device can have a lower weight which is of advantage.

Described herein are additional embodiments that provide features which afford additional technical advantages.

In one embodiment, the physical environment condition can be a driving situation of a vehicle, wherein the driving situation of the vehicle can be based on a motion phase of the vehicle or a parking phase of the vehicle. In other words, in the motion phase of the vehicle, the control circuitry may be adapted to enable the displaying of the at least one graphic display object in the first orientation with the predefined display alignment, so that the user, who can be the driver, inside the vehicle can have access to display contents of the at least one graphic display object or information represented by the at least one graphic display object through the display panel. The display contents can be a navigational route and/or a weather report and/or an output of an infotainment system. Furthermore, the display contents of the graphic display object can be in form of apps, which can be accessed by the user, in order to access the functionalities of other devices in the vehicle. However, in the parking phase of the vehicle, the control circuitry may be adapted to display the at least one graphic display object in the second orientation with the predefined display alignment, so that at least one of the plurality of persons outside the vehicle can be able to perceive the at least one graphic display object. In the parking phase, the primary subareas that cover the at least one graphic display object can be adjusted to the transparent state, in order to the enable the viewability of the at least one graphic display object. Furthermore, in an example in the parking phase of the vehicle, the remaining primary subareas that are not covered by the at least one graphic display object may be adjusted to the opaque state, so that the interior room of the vehicle is not viewable to any other person or the plurality of persons outside the vehicle. This can ensure a safety of the vehicle, for example, from theft. Furthermore, the user can leave some of his personal commodities, such as his laptop, in the vehicle, when he has parked the vehicle and goes out, since the commodities may not be visible to the people outside the vehicle due to the adjustment of the primary surfaces, that are not covered by the at least one graphic display object, to the opaque state.

In one embodiment, the physical environment condition can be based on an identification of a presence of the user or at least one person in a predefined threshold distance from the display device, as signaled by a proximity sensor. The proximity sensor can be a capacitive sensor or a photoelectric sensor or an inductive proximity sensor or an ultrasonic sensor or a radar sensor. Such a proximity sensor can be installed on the outer surface of the vehicle, such that when the user or at least one of the plurality of persons lie or approach within a predefined distance from the display device outside the vehicle, then the presence of the user or at least one of the plurality of persons can be identified and a proximity signal can be sent from the corresponding proximity sensor to the control circuitry. The control circuitry can in turn enable the displaying of the at least one graphic display object in the second orientation on the display panel. This is of advantage, because this enables the activation of the display panel only at the presence of the user or at least one of the plurality of persons near the display device, so that it can be ensured that the information represented by the at least one graphic display object is only visually accessible to the user or at least one of the plurality of persons, only when he or they lie within the predefined threshold distance from the display device. Furthermore, this ensures the conservation of energy, since the display panel can be switched on or activated only in the presence of the user or the plurality of persons near the display device, rather than that the display panel is switched on in a continuous manner even in the absence of any user or person in front of the display device or far away from the display device. For example, the graphic display object can include a text message, such as to welcome the user or the plurality of persons, when he or they arrive close to the display device or the vehicle. In another example, the display of the graphic display object can turn on only when the user is outside of the vehicle, which may be ensured by recognition by phone/face recognition/motion analysis, for example, recognizing the way the user moves.

In one embodiment, in accordance with the physical environment, information represented by the at least one graphic display object can be a predefined text message and/or a predefined graphic message with the at least one graphic display object in accordance with the predefined display alignment in the second orientation. This is of advantage, because the predefined text message and/or a predefined graphic message can be a welcome message or a greeting or an advertisement or a news related message. Furthermore, in the parking phase of the vehicle when the at least one graphic display object is displayed in the second orientation, then the information represented by the graphic display object can be adapted according to a weather condition outside the vehicle and/or a traffic condition and/or location of the vehicle. Hence, an efficient displaying of the information represented by the at least one graphic display object can be realized.

In one embodiment, the predefined text message and/or the predefined graphic message can include a personal message referring to a predefined user, as signaled by a face recognition sensor and/or a receiver for receiving an identification signal from a mobile device or a mobile phone recognition or motion recognition. In other words, a face recognition sensor or other machine vision processing sensor may be used to identify a predefined user in the proximity of the vehicle. Furthermore, the data of the predefined user may be pre-stored in the control circuitry of the vehicle or the backend server unit. Upon recognition of the predefined user, the control circuitry can identify for example the name of the user from the data, that is pre-stored in the control circuitry and/or can communicate with the backend server unit, which in turn can send the related data to the control circuitry. The control circuitry can then be adapted to enable the displaying of a predefined text message including the personal message on the display panel in the second orientation. A further advantage can be that certain personal messages which can be only meant to be displayed to a particular predefined user, can be displayed only to that particular predefined user and not to any other person. This can enable security as well as privacy.

In one embodiment, information represented by the at least one graphic display object is a predefined parking time with the at least one graphic display object in accordance with the predefined display alignment in the second orientation. In other words, when a parking place at a parking location is found, the vehicle can be driven to the parking place and park the vehicle. Upon the parking of the vehicle, the control circuitry can identify the parking of the vehicle by use of a GPS unit (global positioning system) which can provide the location of the parking place or by an identification of a stoppage of an engine of the vehicle for a predefined amount of time which can indicate the parking of the vehicle. Upon the parking of the vehicle, the control circuitry can trigger an adjustment of the at least one graphic display object in accordance with the predefined display alignment in the second orientation, such that the display panel can be visibly accessible to the user or to the at least one person outside the vehicle. In this situation, the information represented by the at least one graphic display object can be in form of a predefined parking time. The predefined parking time may include the time of parking of the vehicle as well as the amount of time remaining from the allowed amount of time to be parked as per the digital ticket.

In one embodiment, the graphic display object can correspond to a functionality of a light emitting device of the vehicle with the at least one graphic display object in accordance with the predefined display alignment in the second orientation. This is advantageous because the graphic display object can function to display a light emitting region with a predefined color and light intensity, so that the display device can function as an additional blinker or an additional parking light or show graphics that fit with head lights.

In one embodiment, the primary subareas can be separated by a primary space between each other. This can enable a wiring across the respective primary subarea. The wiring can enable the adjustment of the voltage difference across that particular primary subarea. The primary space can be about 0.1 millimeter in width. In other words, the primary subareas can be situated at about 0.1 millimeter apart from each other.

Furthermore, in case of a PDLC or a DSLC screen the plurality of primary subareas can be in touch with a border of the second layer. The primary subareas can also be in the form of floating elements, however, in this case primary space needs to be 4 mm wide when the PDLC or DSLC is the contact, which can lead to an unattractive pattern. However, the pattern can be relatively attractive if the primary subareas touch the border, when the contact is a wire, as it can be thinner like a segmented liquid crystal device. Furthermore, in the case of a transparent segmented liquid crystal device, the primary space can be much narrower, about 0.2 mm-0.4 mm.

However, a transparent OLED can display several colors but not black color. It can show some gray (the grid) when the backlight is low. The primary subareas of the second layer can be of a black color in an opaque state or in a state between the transparent state and the opaque state. In this case, in order to depict a black color, especially when the graphic display object is displayed in the first orientation, the primary subareas of the second layer corresponding to a particular region of the at least one graphic display object can be transformed to the opaque state, whereas the pixel elements of the first layer, which lie in front of a particular region or at least a part of the corresponding particular primary subareas, may not be actuated by the control circuitry. This can enable the user to view the primary subareas in the opaque state, since the pixel elements corresponding to the primary subareas remain transparent, as they may be now in a non-activated state. This can lead to a formation of a black colored image or a black colored region of the at least one graphic display object. However, due to the presence of the primary spaces between the primary subareas, which in turn may be transparent or nearly transparent, in the case when the primary subareas and a foil in between is not 100 percent transparent, the transparent or nearly transparent primary spaces can be seen between the black colored opaque primary subareas. This can lead to a formation of an inhomogeneous depiction of a black region of the at least one graphic display object, especially when the graphic display object is displayed in the first orientation and is meant to be perceivable to the user or the plurality of persons inside the vehicle. However, a homogenous black image or a black region on the graphic display object or a black background around a graphic display object is ergonomically and aesthetically desirable. Hence, in order to depict a homogeneous black background, the display panel can include a third layer, wherein the third layer can include a webbed structure and can be designed to attenuate light in the primary space between each of the primary subareas. This is of advantage, because in the case of a black region, the primary space between the primary subareas which was earlier in the form of a transparent region or as a transparent space between the black colored opaque primary subareas, can now be occupied by the third layer, which in turn attenuates the transmission of light. This can lead to the formation of a homogeneous black background as desired, for example when the graphic display object is displayed in the first orientation. This is of further advantage, because the third layer offers a simple and an inexpensive way to achieve the desired homogenous black image or black background corresponding to a graphic display object.

Furthermore, the webbed structure can include an opaque material and is designed to cover the primary space between each of the primary subareas. In other words, the webbed structure can be in the form of a pattern which can be printed or otherwise applied to cover the primary space between the primary subareas fully or partially. In a case, when the first layer is in a non-activated state or the pixel elements of the first layer are in a non-activated state, then the first layer is transparent and at the same time, if the second layer is at a transparent state, then the webbed structure becomes viewable. However, when the predetermined primary subareas are transformed to the opaque state, then a homogeneous black background or image is viewable. This is of advantage, because this enables the formation of a homogeneous black or monochromatic background or image as desired when a graphic display object or at least a part of the at least one graphic display object of black color is desired. Furthermore, there may be a little overlap between the webbed structure and the primary space because of tolerances, hence, the webbed structure may be designed to be wider than the primary space.

However, when the at least one graphic display object is to be perceivable from the second panel side, the at least one graphic display object is displayed in the second orientation and when a black colored region in the graphic display object is desired, then in this case, the black colored region in the graphic display object can be achieved by adjusting the pixel elements of the first layer corresponding to the black colored region in the graphic display object in the non-actuated state, that is transparent. Whereas the primary subareas corresponding to the black colored region can be adjusted to the opaque state, in another example, the primary subareas corresponding to the black region can be adjusted to the transparent state, since a dark interior room of the vehicle can ensure for the depiction of the dark or black colored region of the graphic display object. In another example, the primary subareas corresponding to the black region can be adjusted to a state between the opaque and the transparent state.

In one embodiment, the third layer can include a plurality of predetermined secondary subareas each having an adjustable degree of light transmission, wherein the secondary subareas may be separated by a secondary space between each of them. The control circuitry can be adapted to adjust a respective light transmission to a predetermined individual degree for each of the plurality of the predetermined secondary subareas of the third layer independent of each of the respective secondary subareas. In other words, the third layer is in the form of the second layer, where the predetermined secondary subareas can be electrically conducting, such that the degree of transmission of light through each of the secondary subareas can be adjusted by adjusting a voltage difference across the corresponding secondary subareas. Similar to the primary subareas of the second layer, the secondary subareas of the third layer can be separated by a secondary space between each of them. The secondary space between each of the secondary subareas is due to the wiring and electrical isolation between segments needed to provide the voltage difference between each of the corresponding secondary subareas. Furthermore, the secondary subareas can have a quadrilateral form and/or a triangular form and/or a polygonal form or a mixture of different forms, such that a sum of the areas of the secondary subareas and the secondary space between them forms the area of the entire third layer. The secondary subareas can be of a similar shape and/or size as compared to the primary subareas. Furthermore, the secondary subareas can be of a different shape and/or size as compared to the primary subareas. Moreover, the secondary subareas can be of a partly similar and/or of partly different shape and/or size as compared to the primary subareas. The control circuitry can be adapted to adjust the light transmission to a predetermined individual degree of each of the plurality of predetermined secondary subareas in a similar manner as described in the case of the primary subareas of the second layer. This is of advantage because this enables an attenuation of light in the case, for example when a black region exists in the graphic display object, or for example when the graphic display object is to be displayed in the first orientation. Since, the secondary subareas of the third layer are located to cover the primary spaces of the second layer from behind, a homogeneous black region or image as a whole can be enabled on the display panel.

However, when the at least one graphic display object is to be perceivable from the second panel side, the graphic display object is displayed in the second orientation and when a black colored region in the graphic display object is desired, then in this case, the black colored region in the graphic display object can be achieved by adjusting the pixel elements of the first layer corresponding to the black colored region in the graphic display object in the non-actuated state, that is transparent. Whereas the primary subareas and the secondary subareas corresponding to the black colored region can be adjusted to the opaque state, in another example the primary subareas and the secondary subareas corresponding to the black region can be adjusted to the transparent state, since a dark interior room of the vehicle can ensure for the depiction of the dark or black colored region of the graphic display object. In another example, the primary subareas and the secondary subareas corresponding to the black region can be adjusted to a state between the opaque and the transparent state.

Also described herein is a vehicle including the display device described herein, wherein the display device includes a display panel for displaying at least one graphic display object, and control circuitry.

Also described herein are embodiments of the vehicle that include features that correspond to features as they have already been described in connection with the embodiments of the display device. For this reason, the corresponding features of the embodiments of the vehicle are not described here again.

The vehicle described herein may be designed as a motor vehicle, for example as a passenger vehicle or a truck, or as a bus or a motorcycle.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1:
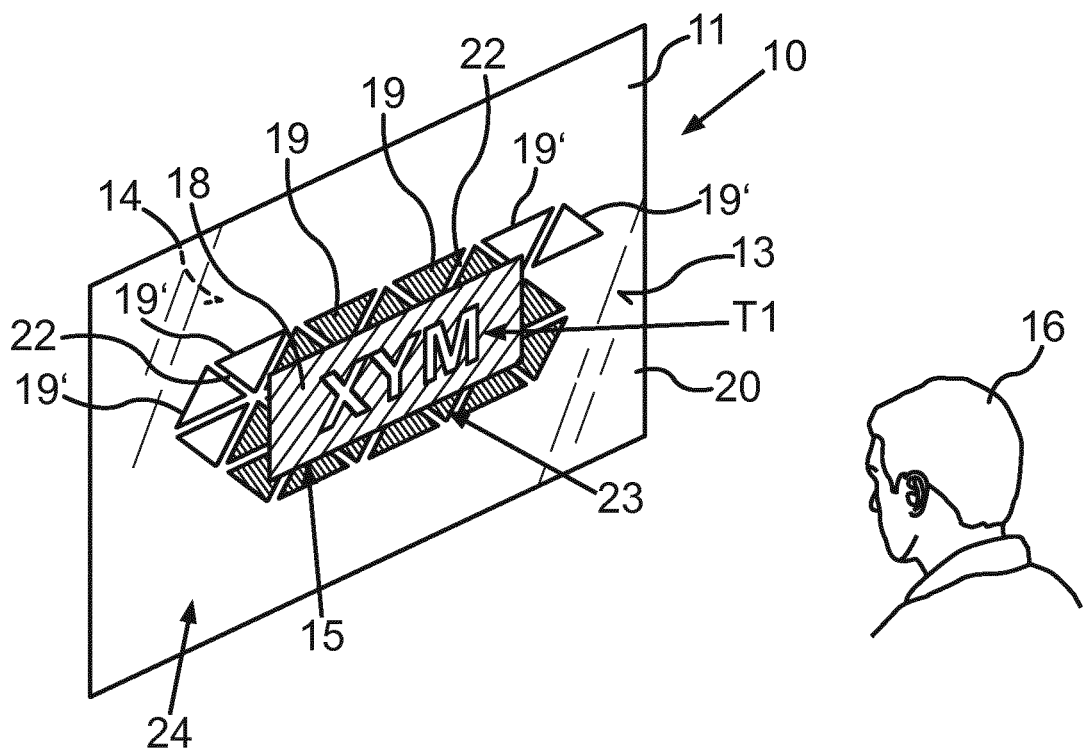
FIG. 1 is a schematic illustration of an embodiment of the display device.

The embodiments explained herein are examples. However, in the example embodiments, the described components of the embodiments each represent individual features which are to be considered independently of each other and which also each develop the disclosure independently of each other and thereby are also to be regarded as a component of the disclosure in an individual manner or in another combination other than the shown combinations. Furthermore, the described embodiments can also be supplemented by further features described herein.

Reference will now be made in detail to examples which are illustrated in the accompanying drawings. In the drawings identical reference signs or characters indicate elements that provide the same function.

Figure 13:
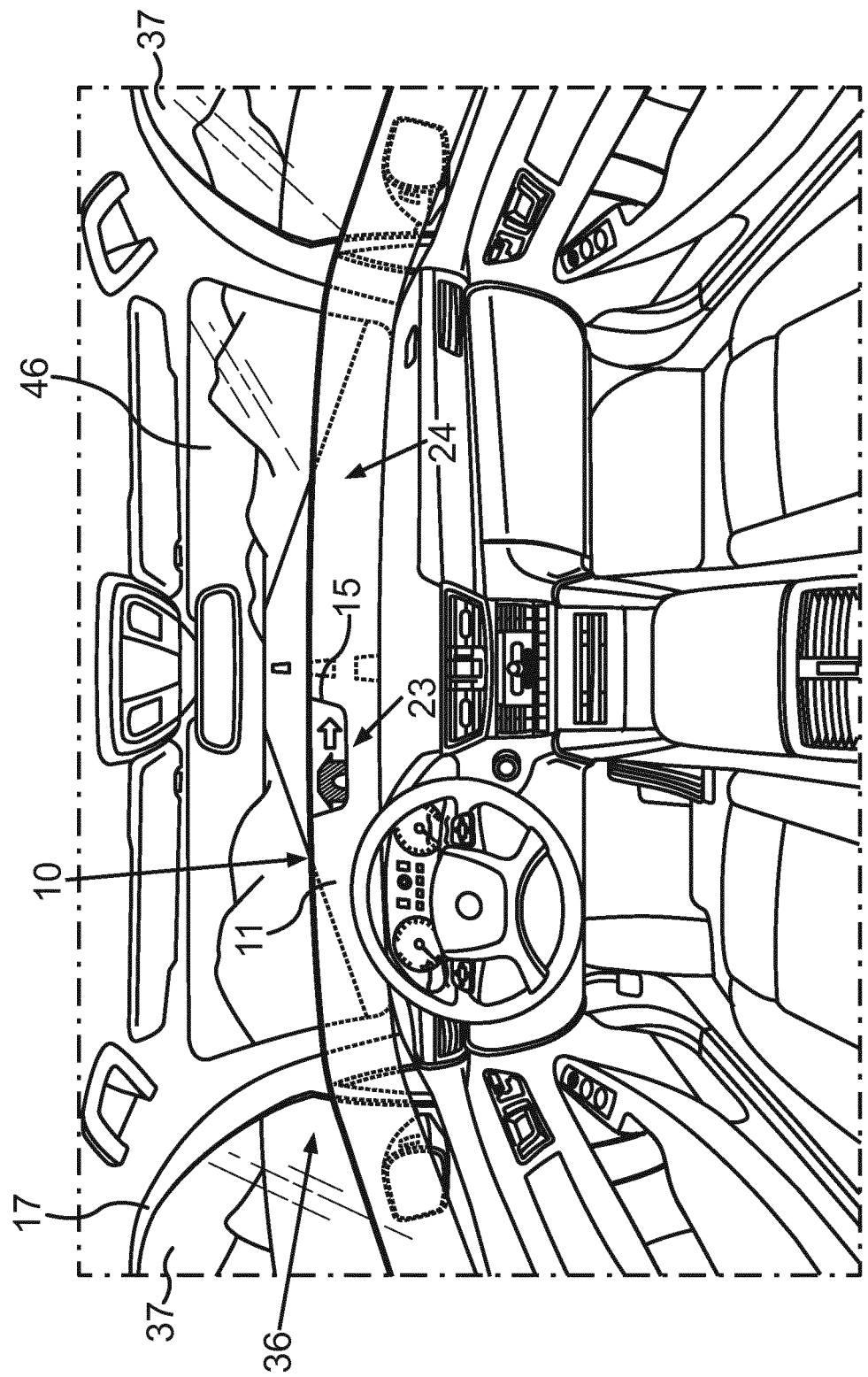
FIG. 13 is a schematic illustration of an interior region of a vehicle with the display device.

FIG. 1 shows a schematic diagram of an embodiment of a display device 10. The display device 10 includes a display panel 11 with a first panel side 13 and a second panel side 14. The display panel 11 is designed to display at least one graphic display object 15, wherein the at least one graphic display object 15 includes a predefined display alignment, due to which a person can be able to perceive the information represented by the at least one graphic display object 15. The display panel 11 can be in form of a touch screen and can function as a graphical user interface (GUI). A user 16, who can be a driver of a vehicle 17, as shown in FIG. 13, can communicate with the other devices (not shown in the drawings.) in the vehicle 17 by use of a touch or a voice signal or a gesture or by use of a remote control circuitry (not shown in the drawings) through the display panel 11. The at least one graphic display object 15 may be a logo or an app or a vehicle GUI.

Figure 2:
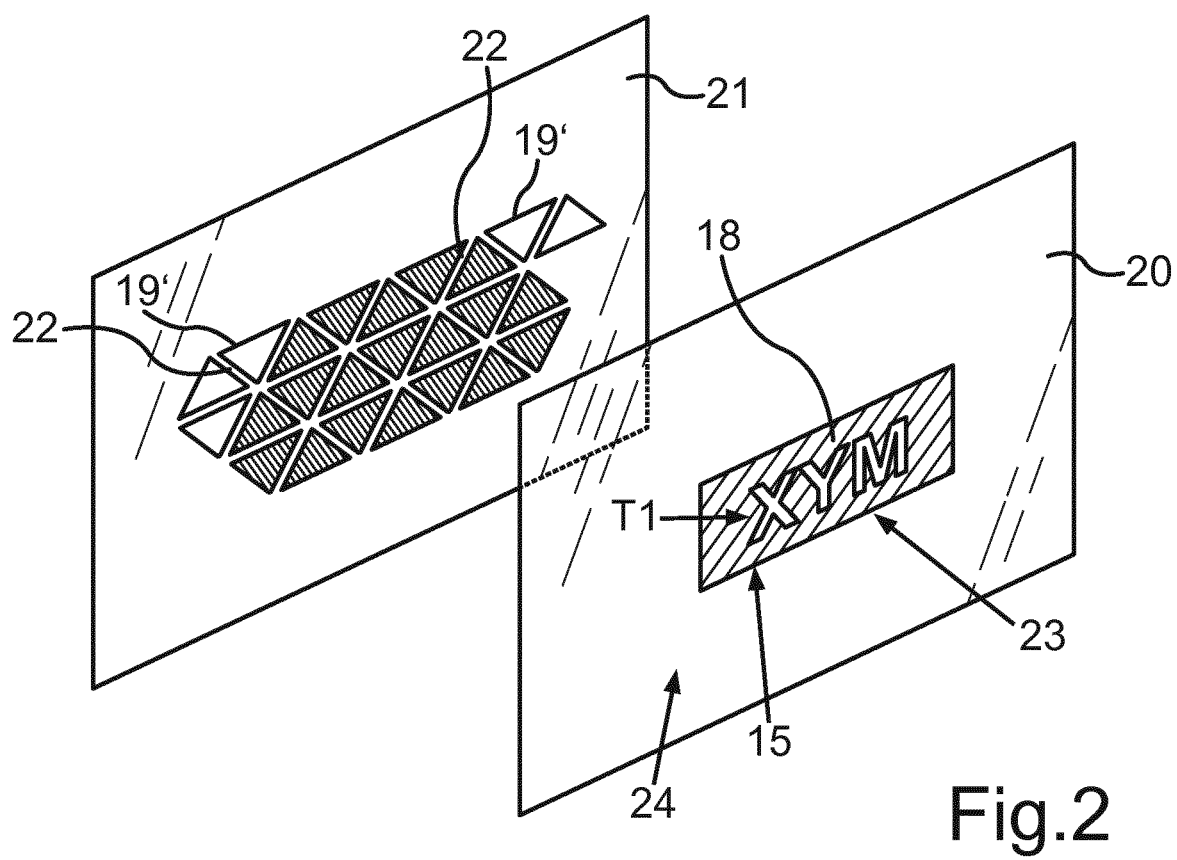
FIG. 2 is an explosion illustration of an embodiment of the display device including a first layer and a second layer.

As shown in FIG. 2, the display panel 11 includes a first layer 20 and a second layer 21, wherein the first layer 20 is a pixel matrix. The first layer 20 can be in form of a TOLED screen. Furthermore, the display device 10 may include a control circuitry (not shown in the drawings). The control circuitry is designed to activate at least one pixel element of the pixel matrix (not shown in the drawings) for displaying the at least one graphic display object 15, wherein in a non-activated state each pixel element is transparent.

The second layer 21 includes a plurality of primary subareas 19, 19' having an adjustable degree of light transmission. The primary subareas 19, 19' may be in the form of quadrilateral shapes or triangular shapes or polygonal shapes or a mixture of the aforementioned shapes. As shown in the FIG. 1, the primary subareas 19, 19' are in triangular forms. The primary subareas 19, 19' of the second layer 21 can be designed to allow a transmission of electricity or can be electrically conductive. In order to achieve an adjustable degree of light transmission, a voltage difference can be enabled across each of the primary subareas 19, 19'. This can enable a transformation of each of the primary subareas 19, 19' from a transparent state to an opaque state depending on the degree of the voltage difference across that particular primary subarea 19, 19'. Furthermore, in the case of PDLC or DSLC, the primary subareas 19, 19' can be transformed to a state between the opaque state and the transparent state. As shown in the FIG. 1 and the FIG. 2, the primary subareas 19, which are at least covered by the graphic display object 15, are in the opaque state, whereas the other primary subareas 19', which are not at least covered by the graphic display object 15, are in the transparent state.

The voltage difference across each of the primary subareas 19, 19' can be adjusted by use of a wiring due to which, each of the primary subareas 19, 19' are separated or are surrounded by a primary space 22 between each of them. The primary space 22 can enable the wiring across the respective primary subarea 19, 19'. The wiring can enable the voltage difference across that particular primary subarea 19, 19'. The control circuitry is adapted to adjust a respective light transmission to a predetermined individual degree for each of the plurality of the predetermined subareas 19, 19' of the second layer 21 independent of each of the respective remaining primary subareas 19, 19'. For the sake of understandability the other primary subarea 19', as shown in the FIG. 1 and FIG. 2, are in the transparent state.

For example, when a display region 23 can be selected on the display panel 11, in order to display the at least one graphic display object 15 on the display region 23. The control circuitry is designed to activate the pixel elements of the first layer 20 corresponding to the display region 23, such that the pixel elements corresponding to the display region 23 radiate light in the respective colors associated with the at least one graphic display object 15. However, a remaining part of the display panel 11 outside the display region 23, that is a non-displaying region 24, can remain transparent. In this case, the pixel elements corresponding to the non-displaying region 24 remain in a non-activated state due to which each of the pixel elements corresponding to the non-displaying region 24 can remain transparent. In order to display the graphic display object 15 on the display panel 11, the control circuitry is designed to determine the respective primary subareas 19, which are at least partly occupied by the at least one graphic display object 15. The primary subareas 19, which are at least occupied by the at least one graphic display object 15, are turned opaque by changing the voltage difference across each of the corresponding primary subareas 19 corresponding to the display region 23. The control circuitry is adapted to adjust the light transmission of the respective primary subareas 19 to a degree lower than that of the primary subareas 19', which are not at least partly occupied by the graphic display object 15.

Furthermore, the control circuitry is adapted to enable the displaying of the at least one graphic display object 15 in accordance with the predefined display alignment in one of a first orientation T1 and a second orientation T2. In the first orientation T1, the at least one graphic display object 15 is perceivable on the first panel side 13 in the predefined alignment. For the sake of understandability, the at least one graphic display object 15 is in the form of a text message "XYM", for example, yellow in color, and with a colored background 18, which can be, for example, blue in color (represented by indented lines with broad spaces). The at least one graphic display object 15 is in the first orientation T1, such that the at least one graphic display object 15 can be perceived by the user 16, on the first panel side 13, as the text message "XYM". In other words, the user 16, who can be seated inside the vehicle 17, can be able to perceive the text message "XYM" represented by the graphic display object 15. For the perceivability of the user 16, on the first panel side 13, that is inside the vehicle 17, the primary subareas 19 are adjusted to an opaque state. However, the remaining primary subareas 19', which are not at least occupied by the least one graphic display object 15 remain in a transparent state.

Figure 3:
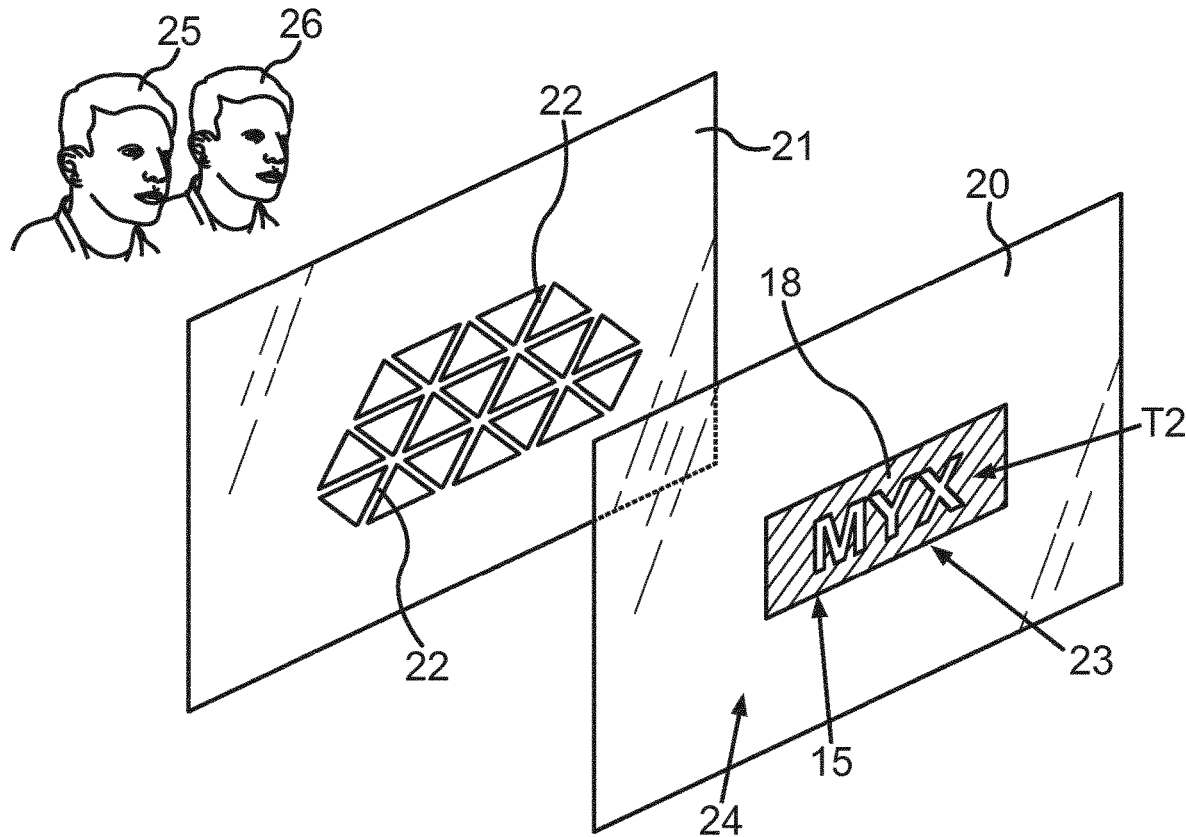
FIG. 3 is an explosion illustration of an embodiment of the display device including the first layer and the second layer.
Figure 14:
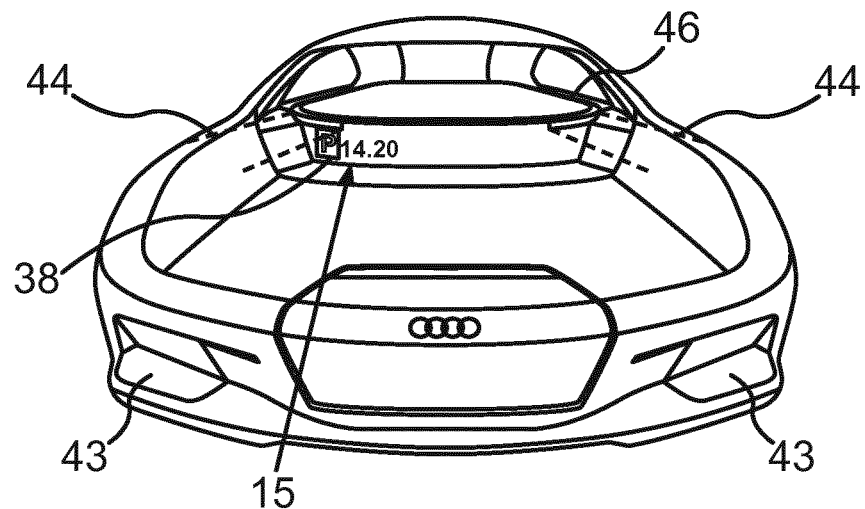
FIG. 14 is a front view of the vehicle with the display device.

The predefined display alignment for the graphic display object 15 is that the text message "XYM" is to be perceived as "XYM" by the user 16 inside the vehicle or by a plurality of persons 25, 26 outside the vehicle, as shown in FIG. 3, in this case. However, if the test message "XYM" is to be able to be perceivable the plurality of persons 25, 26, who are outside the vehicle 17, that is on the second panel side 14, then the graphic display object 15 representing the text message "XYM" has to be displayed in the second orientation T2, that is as a mirror image of "XYM", that is as "MYX" on the first layer. Furthermore, the primary subareas 19, 19' of the second layer 21 need to be adjusted to a transparent state, so that the displayed text message "MYX" represented by the at least one graphic display object 15 on the first layer 20 can be visible through the primary subareas 19, 19' of the second layer 21. Hence, the text message "MYX" in the second orientation T2 can be perceived by the plurality of persons 25, 26 outside the vehicle 17 as the text message "XYM". For example, the display device 10 can be integrated in a dashboard of the vehicle 17, as shown in FIG. 13, such that on the first panel side 13 of the display panel 11, the at least one graphic display object 15 can be perceivable by the user 16, that is from inside the vehicle 17 and such that the on second panel side 14 of the display panel 11, the at least one graphic display object 15 can be perceivable by a plurality of persons 25, 26 from outside the vehicle through the transparent windscreen 46, as shown in FIG. 14, wherein the at least one graphic display object 15 representing a predefined parking time 38, for example "14:20", is displayed by the display panel 11 in the second orientation T2.

The control circuitry is adapted to adjust a respective light transmission to a predetermined individual degree for each of the plurality of the predetermined primary subareas 19, 19' of the second layer 21 independent of each of the respective remaining primary subareas 19, 19' in accordance with a physical environment condition and/or in accordance with the orientation T1, T2 of the at least one graphic display object 15. The physical environment condition can be a driving situation of the vehicle 17. The driving situation of the vehicle 17 can be based on a motion phase of the vehicle or a parking phase of the vehicle 17. Furthermore, the physical environment condition can be based on an identification of the user 16 or at least one of the plurality of persons 25, 26 in a predefined threshold distance from the display device 10, as signaled by a proximity sensor (not shown in the drawings).

Figure 4:
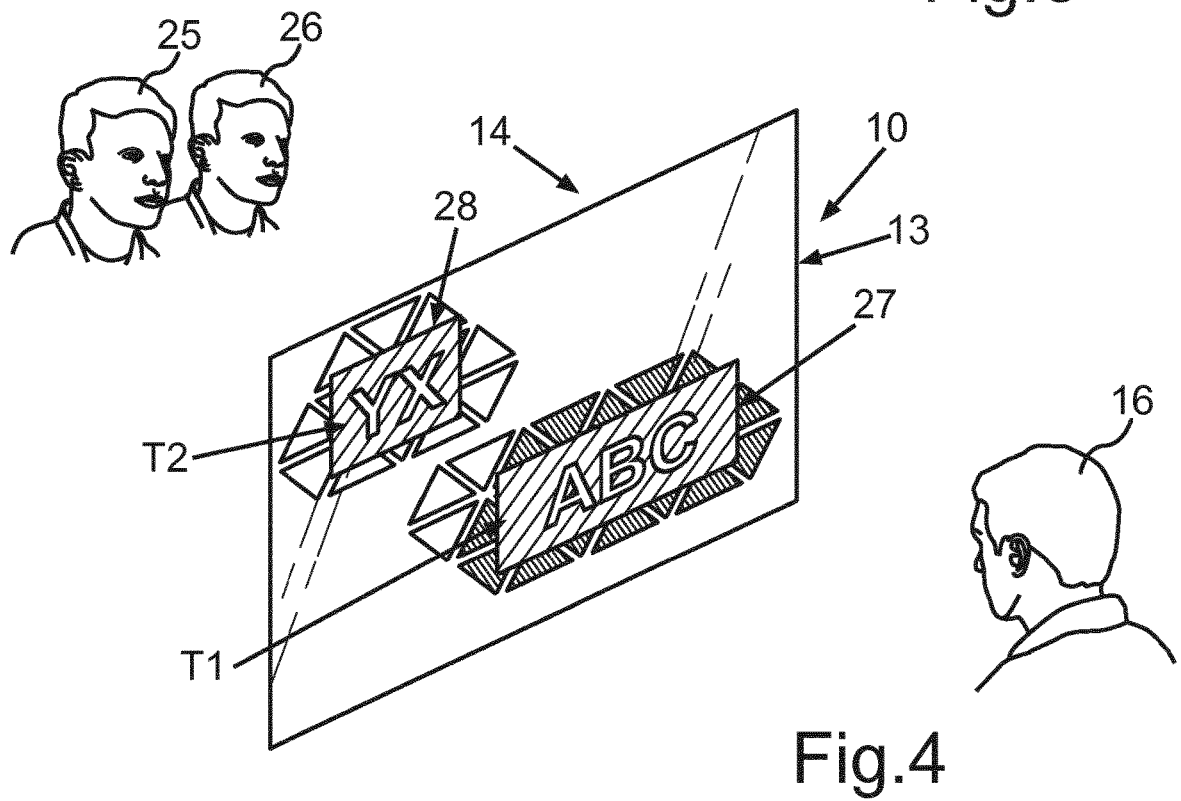
FIG. 4 is a schematic illustration of an embodiment of the display device.
Figure 5:
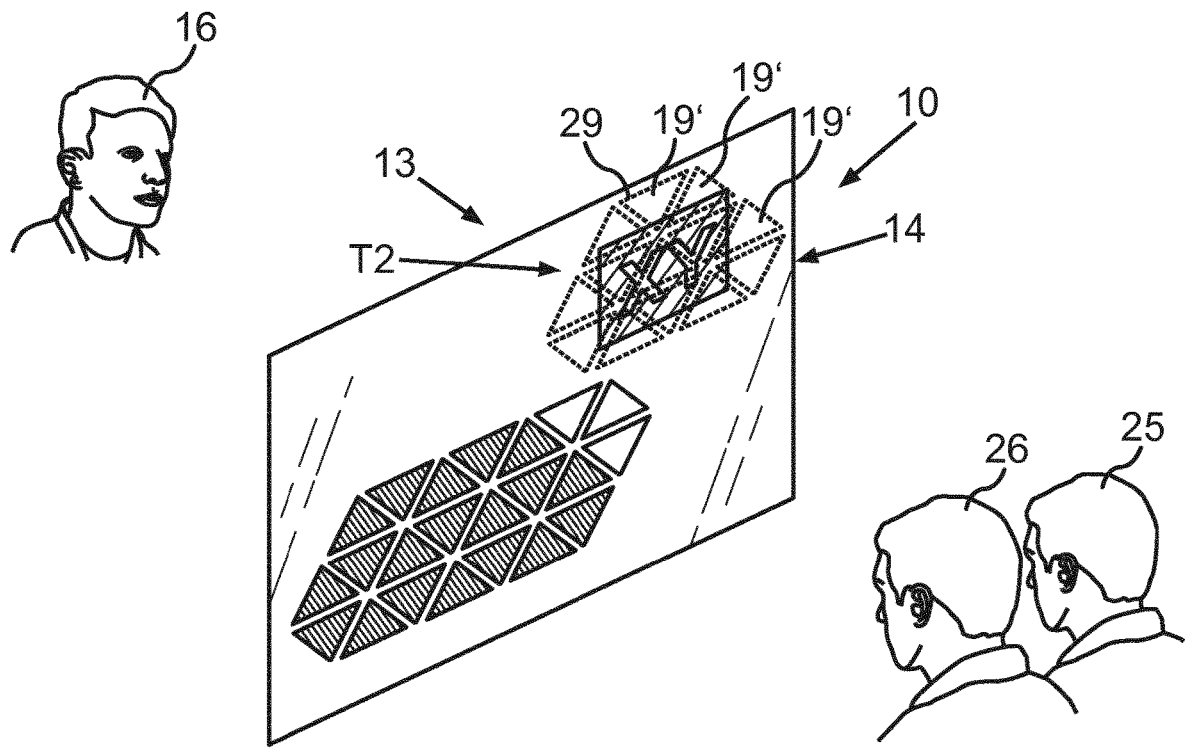
FIG. 5 is a schematic illustration of an embodiment of the display device.

FIG. 4 shows the display device 10, wherein the at least one graphic display object 15 includes a first graphic display object 27 and a second graphic display object 28. Information represented by the first graphic display object 27 is a text message "ABC" in the first orientation T1, so that the user 16 can be able to perceive the first graphic display object 27 on the first panel side 13. Furthermore, information represented by the second graphic display object 28 is a text message "XY" in the second orientation T2, so that the plurality of persons 25, 26, who are outside the vehicle 17, can be able to perceive the second graphic display object 28 on the second panel side 14. Hence, in order to enable the displaying of the second graphic display object 28 with the text message "XY", the second graphic display object 28 is generated as a text message "YX" on the first layer 20 on the first panel side 13, so that the mirror image of "YX" is perceivable as "XY" on the second panel side 14 by the plurality of persons 25, 26, as shown in FIG. 5. Further, FIG. 5 depicts the display device 10, as perceived by the plurality of persons 25, 26 on the second panel side 14. Furthermore, in order to enable the plurality of persons 25, 26 to view the second graphic display object 28, the predetermined primary subareas 19; 19' corresponding to the second graphic display object 28 are adjusted to the transparent state. For the sake of understandability, the predefined primary subareas 19' in the transparent state, which lie in front of the second graphic display object 28 are depicted by dashed lines 29 in FIG. 5. Since, on the second panel side 14, the first layer 20 is located behind the second layer 21 with respect to the plurality of persons 25, 26. Moreover, in order to enable the user 16 to view the first graphic display object 27 clearly, the predetermined primary subareas 19, 19' corresponding to the first graphic display object 27 are adjusted to the opaque state. Hence, the first graphic display object 27 is not perceivable by the plurality of persons 25, 26, as it is covered by the corresponding predefined primary subareas 19, 19'.

Figure 6:
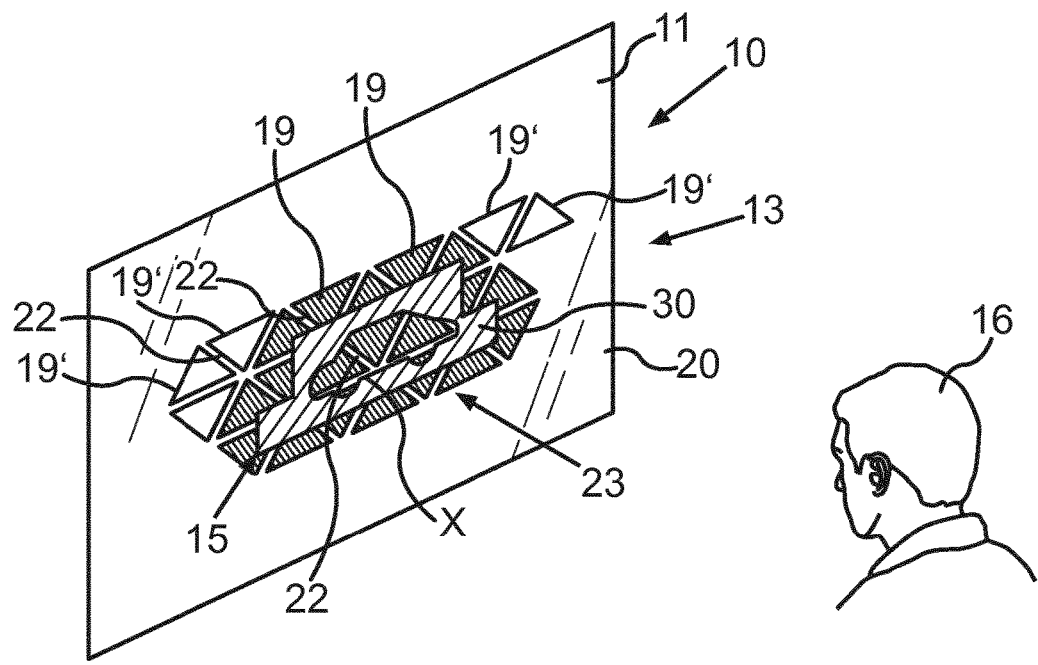
FIG. 6 is a schematic illustration of an embodiment of the display device.

FIG. 6 depicts the graphic display object 15 including a colored region, for example the red colored background 30 (represented by indented lines with broad spaces), and including a figure X, which can have a form of a car in black color. Hence, it is necessary to achieve the black color of the figure X. Furthermore, since an ideal 100 percent transparency is difficult to achieve, for example, the transparency may be around 40 percent and figure X may have a grey value of 60 percent, then with a large amount of light from the back or outside, the figure X may appear as very light grey or transparent with intense light.

However, a TOLED can display several colors except black but due to the fact that transparency may not be 100 percent, it can display grey color, especially when there may be a little light from the back or outside of the TOLED, it will appear grey and when there is a lot or enough light, it will appear more transparent. In order to achieve the black color, each of the primary subareas 19, 19' can be of black color, such that when they are in an opaque state (primary subareas 19), they depict the black background and when they are in a transparent state (primary subareas 19'), they are in the colorless transparent form. As shown in FIG. 6, a region of the second layer 21 corresponding to the display region 23 of the first layer 20 includes primary subareas 19, which are in black color. In order to display the black colored figure X, the primary subareas 19 covered by the figure x are turned opaque and the pixel elements of the first layer 20 remain in the non-actuated state, so that the part of the first layer 20 covering the figure X remains transparent. Hence, the figure X will be depicted by the black colored primary subareas 19 covered at least partly by the figure X.

Figure 7:
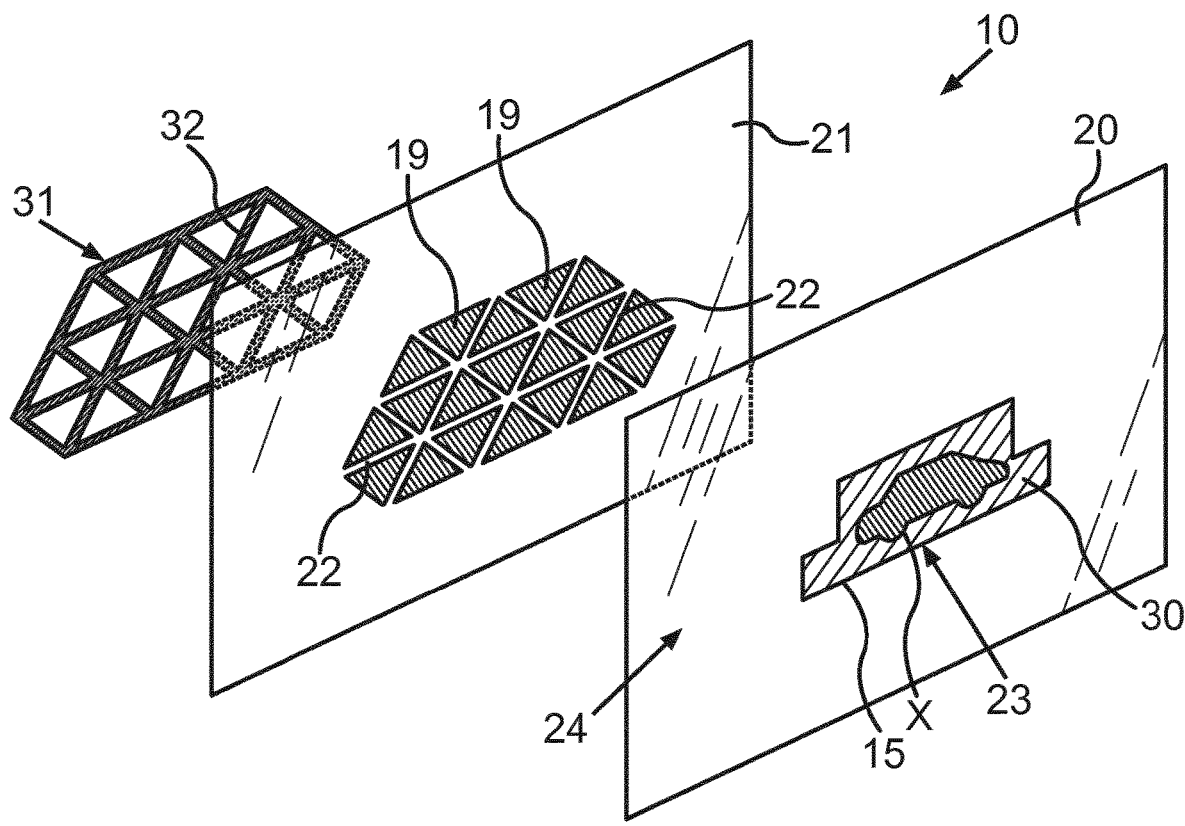
FIG. 7 is an explosion illustration of an embodiment of the display device including the first layer, the second layer and a third layer.
Figure 8:
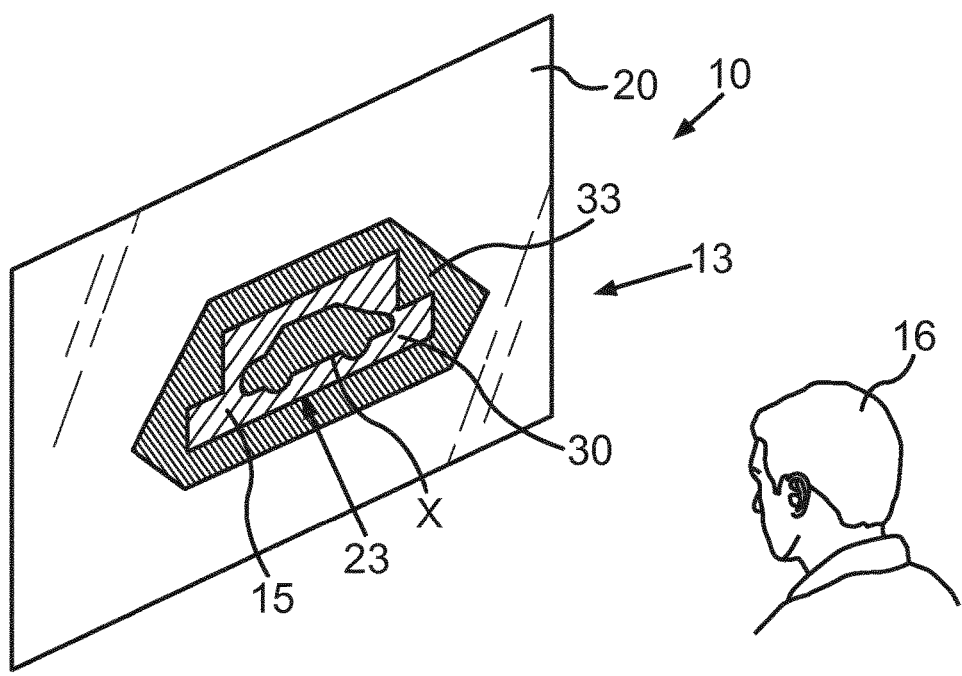
FIG. 8 is a schematic illustration of the display device.

FIG. 6 depicts that the graphic display object 15 is displayed on the first panel side 13 of the display panel 11 in the display region 23. However, the primary spaces 22 between each of the primary subareas 19, 19' can be seen as transparent lines or grey lines depending on the transparency, in the black colored figure X. Moreover, the primary spaces 22 can be seen as transparent lines, between the black colored primary subareas 19 which are in the opaque state. However, this is undesirable and rather a homogeneous black figure X is desired, as shown in FIG. 8. In order to achieve a homogeneous black background or image, the display panel 11 may include a third layer 31 including a webbed structure 32, wherein the webbed structure 32 can include an opaque material and is designed to attenuate light in the primary space 22 between each of the primary subareas 19, 19', as shown in FIG. 7. As shown in FIG. 8, the webbed structure 32 can cover the primary space 22 between the primary subareas 19, 19', which are in an opaque state.

Figure 9:
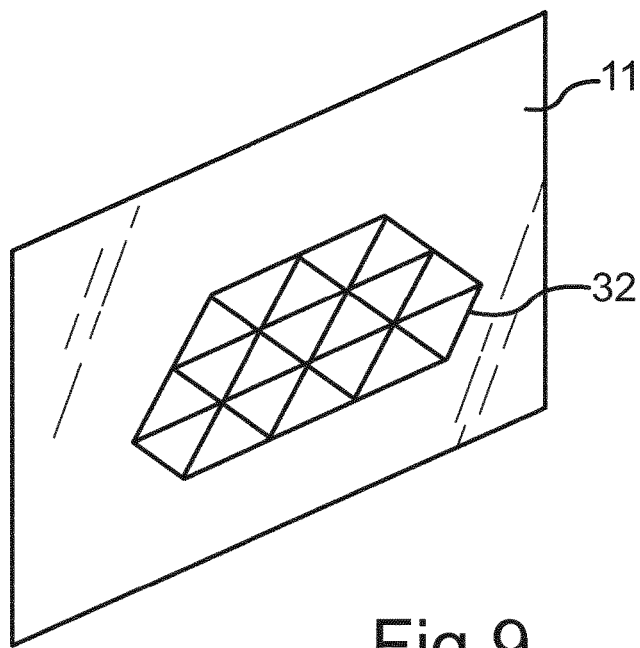
FIG. 9 is a schematic illustration of the display device in a transparent state.

The opaque material may include a black color or grey color. FIG. 8 depicts a homogeneous black region 33, wherein the first layer 20 is in the transparent state, that is all the pixel elements of the pixel matrix of the first layer 20 are in the respective non-actuated state, except the pixel elements corresponding to the red colored background 30 of the graphic display object 15. The homogeneous black region 33 can include the third layer 31 along with the webbed structure 32. FIG. 8 shows a display of the homogenous black colored figure X on the homogeneous black region 33. It can be seen that no primary space 22 can be observed in the depicted homogeneous black region 33 as well as in black colored figure X. However, when both the first layer 20 and second layer 21 are in fully a transparent state, then the webbed structure 32 of the attached third layer 31 can be seen as a black pattern on the display panel 11, as shown in FIG. 9. It is further possible to print the webbed structure 32 in a grey tone or color, so that an optimum can be obtained between the quality of the black region 33 and the visibility of the webbed structure 32, when the display panel 11 is completely transparent.

Figure 10:
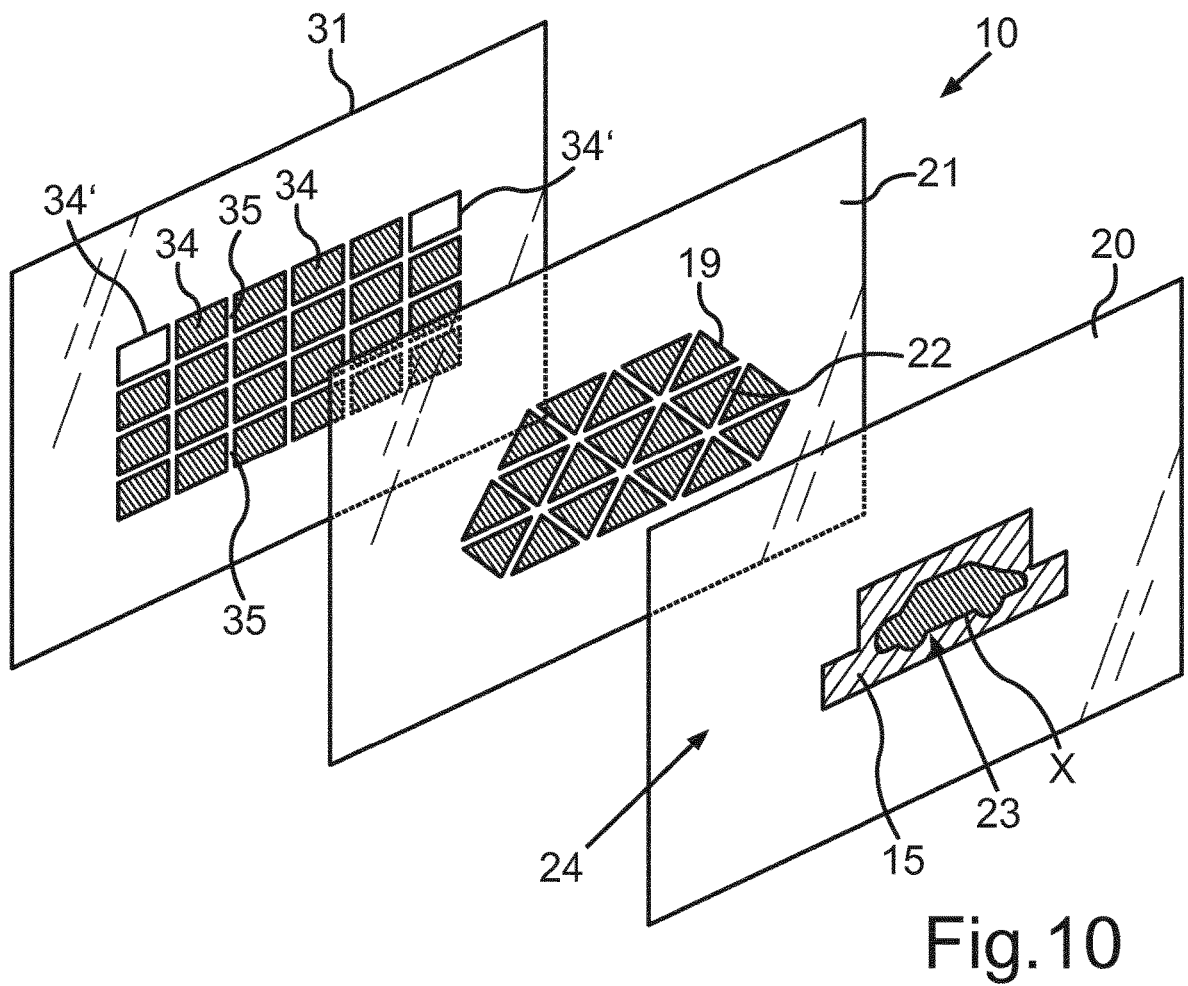
FIG. 10 is an explosion illustration of an embodiment of the display device including the first layer, the second layer and the third layer.

FIG. 10 depicts an explosion illustration of another embodiment of the display device 10, wherein the third layer 31 includes a plurality of predetermined secondary subareas 34, 34' having an adjustable degree of light transmission. The secondary subareas 34, 34' are separated or surrounded by a secondary space 35 between each of them. The control circuitry is adapted to adjust a respective light transmission to a predetermined individual degree for each of the plurality of the predetermined secondary subareas 34, 34' of the third layer 31 independent of each of the other secondary subareas 34, 34'. For the sake of understandability, the secondary subareas 34' are in the transparent state, whereas the secondary subareas 34 are in the opaque state and are black in color. Furthermore, for the sake of understandability, the secondary subareas 34, 34' are quadrilateral shaped as compared to the primary subareas 19, 19' which are triangular shaped.

Figure 11:
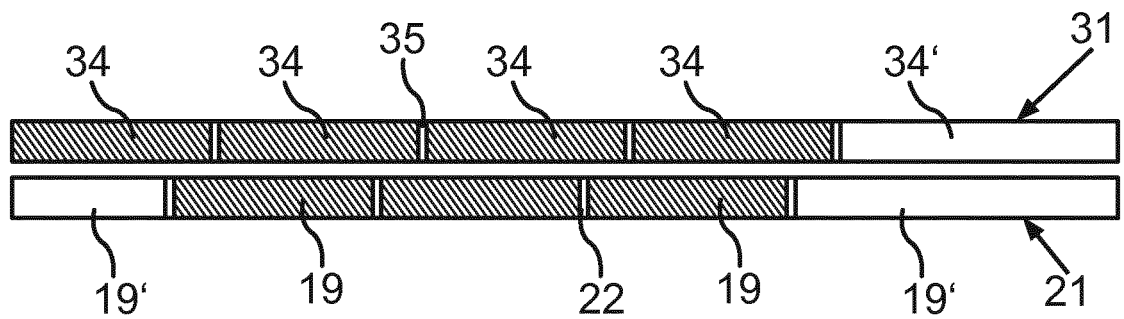
FIG. 11 is a side view of an embodiment of the display device including the second layer and the third layer.

However, the size, shape and arrangement of the secondary subareas 34 is chosen in such a manner, such that secondary subareas 34, 34' overlap or cover the primary space 22 between each of the plurality of the predetermined primary subareas 19, 19'. The plurality of the predetermined secondary subareas 34, 34' are arranged such that each of the plurality of the predetermined secondary subareas 34, 34' cover the primary space 22 between each of the plurality of the predetermined primary subareas 19, 19' either partly or completely, as shown in a side view of the second layer 21 and the third layer 31 in FIG. 11.

Furthermore, the control circuitry is designed to determine the respective primary subareas 19 and the respective secondary subareas 34, which are at least partly occupied by the graphic display object 15. The control circuitry is adapted to adjust the light transmission of the respective primary subareas 19 and respective secondary subareas 34 to a degree lower than that of the other primary subareas 19' and the secondary subareas 34', which are not at least partly occupied by the at least one graphic display object 15. Hence, such an arrangement of the display panel 11 including the first layer 20, the second layer 21 and the third layer 31 including of a plurality of predetermined secondary subareas 34, 34' can lead to the formation of a homogeneous black region (not shown in the drawings) which can be similar to the homogenous black region 33.

Figure 12:
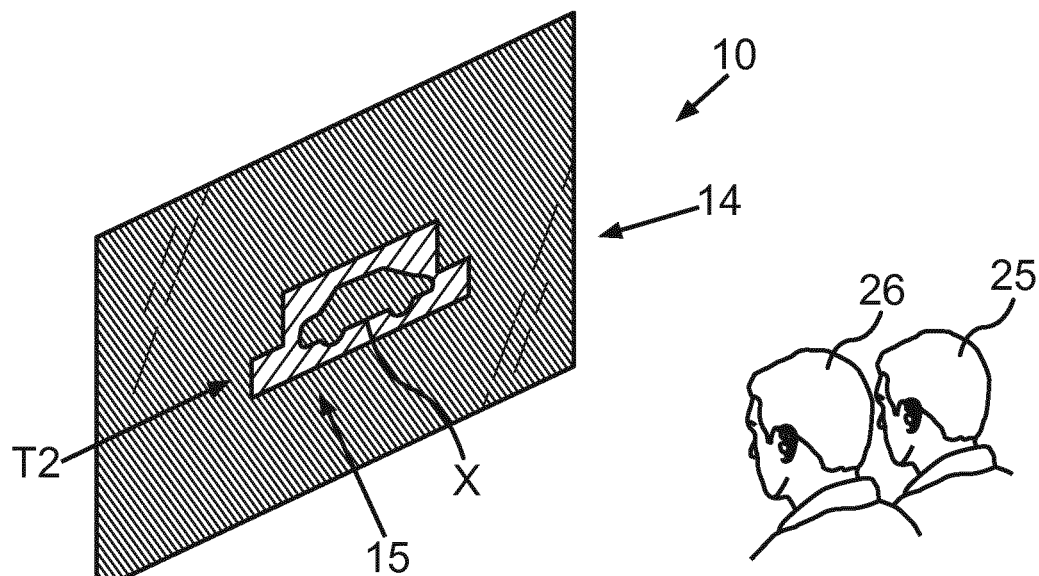
FIG. 12 is a schematic illustration of the display device.

FIG. 12 shows a display of the black colored figure X in the second orientation T2 on the second panel side 14 to the plurality of persons 25, 26 outside the vehicle 17. The black colored figure X in the graphic display object 15 can be achieved by adjusting the pixel elements of the first layer corresponding to the black colored region in the graphic display object 15 in the non-actuated state, that is transparent. Whereas the primary subareas 19, 19' and the secondary subareas 34, 34' corresponding to the black colored region can be adjusted to the opaque state. In another example, the primary subareas 19, 19' and the secondary subareas 34, 34' corresponding to the figure X can be adjusted to the transparent state, since a dark interior room 36 of the vehicle 17 can ensure for the depiction of the dark or black colored figure X of the graphic display object 15. In another example, the primary subareas 19, 19' and the secondary subareas 34, 34' corresponding to the black colored figure X can be adjusted to a state between the opaque state and the transparent state.

FIG. 13 shows the vehicle 17 including the display device 10. The vehicle 17 can be a motor vehicle which can be driven manually or can be self-driving. Furthermore, the display device 10 can be integrated in the vehicle 17 in front of the windscreen 46, that is the region in front of the user 16 of the vehicle 17. In another example such a display device 10 can be integrated in other parts of the vehicle 17, for example on a window panels 37 of the vehicle 17 or window panels of a passenger vehicle such as a bus. Furthermore, the control circuitry of the display device 10 can be designed to adjust a respective transmission of light to the predetermined individual degree for each of the plurality of the predetermined primary subareas 19, 19' of the second layer 21 and each of the plurality of the predetermined secondary subareas 34, 34' of the third layer 31 independently of each of the other remaining primary subareas 19, 19' and the other remaining secondary subareas 34, 34' in accordance with the driving situation of the vehicle 17. The user 16 can access the display device 10 comfortably while driving, since the display device 10 is integrated in front of the windscreen 46 of the vehicle 17 and is located at a reachable distance from the user 16. The user 16 can be able to perceive the external environment outside the vehicle 17 through the windscreen 46 and through the non-display region 24 of the display panel 11 which can be transparent.

FIG. 14 shows a front view of the vehicle 17, wherein information represented by the at least one graphic display object 15 can be the predefined parking time 38, for example "14:20", with the at least one graphic display object 15 in accordance with the predefined display alignment in the second orientation T2.

Figure 15:
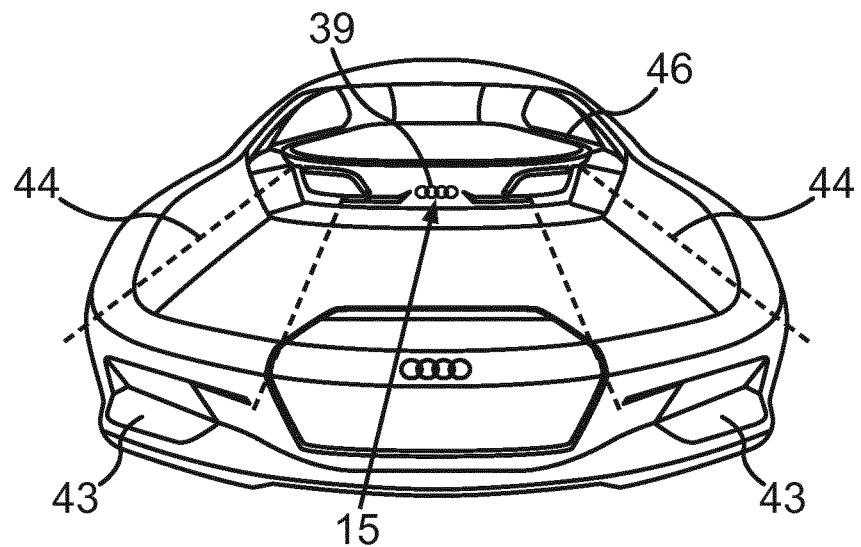
FIG. 15 is a front view of the vehicle with the display device.

FIG. 15 shows the front view of the vehicle 17, wherein information represented by the at least one graphic display object 15 can be a predefined text message and/or a predefined graphic message 39 with the at least one graphic display object 15 in accordance with the predefined display alignment in the second orientation T2. Furthermore, the predefined text message and/or the predefined graphic message 39 can include a personal message referring to a predefined user (not shown in the drawings), as signaled by a face recognition sensor (not shown in the drawings) and/or a receiver for receiving an identification signal form a mobile device (not shown in the drawings). Moreover, the graphic display object 15 can correspond to a functionality of a head light 43 and/or a blinker 44 of the vehicle 17 with the at least one graphic display object 15 in accordance with the predefined display alignment in the second orientation T2. Furthermore, the graphic display object 15 can correspond to a functionality of a light emitting device such as a parking light.

Figure 16:
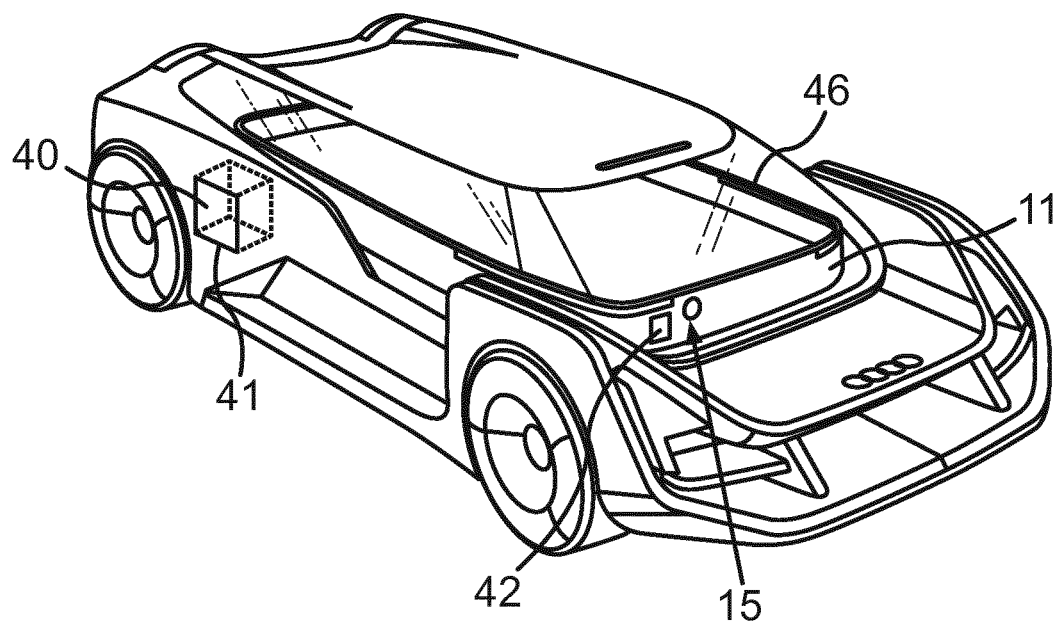
FIG. 16 is a schematic illustration of the vehicle with the display device.

FIG. 16 shows a schematic illustration of the vehicle 17, wherein the vehicle 17 can be used as a packet station or a delivery station, such that the vehicle 17 can include a delivery compartment 40 with a compartment door 41. The user 16 can park the vehicle 17 at a parking location and can login to a website of a delivery company by use of the display panel 11 and order a parcel. Upon which the control circuitry can send a registration signal to a backend server unit, for example of the delivery company. Upon receiving the registration signal, a booking of the vehicle 17 as a packet station can be enabled, moreover, information about the location of the vehicle 17 and the required parcel information can be included in the registration signal. Furthermore, upon receiving the registration signal, the backend server unit can send a signal with a booking code to the control circuitry.

A delivery person of the delivery company can with a parcel can travel to the location of the vehicle 17. Upon reaching the location of the vehicle 17, the delivery person can send a matching signal to the control circuitry of the vehicle 17, by use of his smart phone wirelessly. The matching signal can include the booking code. The matching signal can be received by the control circuitry. Upon receiving the matching signal, the control circuitry can send a vehicle activation signal to an electronic control unit (not shown in the drawings) of the vehicle 17. The electronic control unit upon receiving the vehicle activation signal can open the compartment door 41, so that the delivery personal can place the parcel inside the delivery compartment 40 of the vehicle 17. Furthermore, upon a placement of the parcel inside the delivery compartment 40, the compartment door 41 can be locked by use of the electronic control unit. The electronic control unit can further send a delivery signal to the control unit of the display device 10. Upon receiving the delivery signal, information represented by the graphic display object 15 can be in the form of the delivery message 42, which can be displayed in the second orientation T2 on the display panel 11 notifying that the parcel has been delivered.

Figure 17:
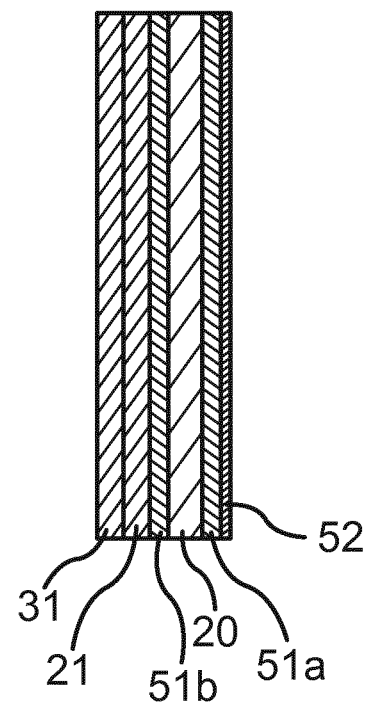
FIG. 17 is a section of the display device with transparent reflective foils.

FIG. 17 shows a section of the display device 10, wherein the display panel 11 includes two transparent reflective foils, namely a first transparent reflective foil 51a and second transparent reflective foil 51b, the transparent reflective foils enable a reflection of light so that an image displayed on the display panel 11 is perceivable. The first layer 20 may be sandwiched between the first transparent reflective foil 51a and the second transparent reflective foil 51b. This may enable the user 16 on the first panel side 13 and/or the plurality of persons 25, 26 to perceive the at least one graphic display object 15 displayed by the display device 10 because of an enhancement in clarity due to the reflection of light. Furthermore, the second layer 21 and the third layer 31 may be included in the display panel additionally. As an example, the display panel 11 may include a touch-foil 52.

Overall, the examples show how the display device 10 enables the display of the display contents of the at least one graphic display object 12 on the display panel 11 in an efficient manner, as described herein.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A display device, comprising:
    a display panel with a first panel side and a second panel side, the display panel including:
    a first layer on the first panel side, the first layer including a pixel matrix, wherein in a respective non-actuated state each pixel element of the pixel matrix is transparent,
    a second layer on the second panel side, the second layer including a plurality of primary subareas having an adjustable degree of light transmission, and the plurality of primary subareas are separated by a primary space between each primary subarea of the plurality of primary subareas, a third layer configured to attenuate light in the primary space and including:
a webbed structure, or
a plurality of secondary subareas having an adjustable degree of light transmission, and
control circuitry configured to:
actuate a pixel element of the pixel matrix for displaying a graphic display object having a predefined display alignment,
estimate a physical environment condition based on a signal from an electronic control unit, based on the estimated physical environment condition,
enable the displaying of the graphic display object according to the predefined display alignment in one of a first orientation and a second orientation,
wherein in the first orientation the graphic display object is perceivable on the first panel side in the predefined display alignment and in the second orientation the graphic display object is perceivable on the second panel side in the predefined display alignment, and
adjust a respective light transmission to a predetermined individual degree for each of a plurality of predetermined primary subareas among the plurality of primary subareas, independent of each of a plurality of respective remaining primary subareas, according to at least one of the estimated physical environment condition or whether the graphic display object is to be displayed in the first orientation or the second orientation.

2. The display device according to claim 1, wherein
the physical environment condition includes a driving situation of a vehicle, and
the driving situation of the vehicle includes a motion phase of the vehicle and a parking phase of the vehicle.

3. The display device according to claim 1, wherein the physical environment condition is based on whether a presence of at least one of a user of a vehicle or a person, is detected within a predefined threshold distance from the display device, based on a signal from a proximity sensor.

4. The display device according to claim 1, wherein according to the physical environment condition, information represented by the graphic display object includes at least one of a predefined text message or a predefined graphic message, and
the graphic display object is displayed according to the predefined display alignment in the second orientation.

5. The display device according to claim 4, wherein the at least one of the predefined text message or the predefined graphic message includes a personal message referring to a predefined user, based on at least one of a signal from a face recognition sensor or a signal from a receiver which receives an identification signal from a mobile device.

6. The display device according to claim 1, wherein
information represented by the graphic display object includes a predefined parking time, and
the graphic display object is displayed according to the predefined display alignment in the second orientation.

7. The display device according to claim 1, wherein
the graphic display object augments a functionality of a head light and/or a blinker of a vehicle, and
the graphic display object is displayed according to the predefined display alignment in the second orientation.

8. The display device according to claim 1, wherein
the primary space includes a plurality of primary spaces, the webbed structure is configured to attenuate light in each primary space of the plurality of primary spaces between each primary subarea of the plurality of primary subareas, and
the webbed structure includes an opaque material.

9. The display device according to claim 1, wherein
the plurality of secondary subareas are separated by a secondary space between each secondary subarea of the plurality of secondary subareas, and
the control circuitry is configured to adjust a respective light transmission to a predetermined individual degree for each secondary subarea of a plurality of predetermined secondary subareas among the plurality of secondary subareas, independent of each secondary subarea of a plurality of respective remaining secondary subareas among the plurality of secondary subareas.

10. A vehicle, comprising:
an electronic control unit; and
a display device, including:
a display panel with a first panel side and a second panel side, the display panel including:
a first layer on the first panel side, the first layer including a pixel matrix, wherein in a respective non-actuated state each pixel element of the pixel matrix is transparent,
a second layer on the second panel side, the second layer including a plurality of primary subareas having an adjustable degree of light transmission, and the plurality of primary subareas are separated by a primary space between each primary subarea of the plurality of primary subareas,
a third layer configured to attenuate light in the primary space and including:
a webbed structure, or
a plurality of secondary subareas having an adjustable degree of light transmission, and
control circuitry configured to:
actuate a pixel element of the pixel matrix for displaying a graphic display object having a predefined display alignment,
estimate a physical environment condition based on a signal from the electronic control unit,
based on the estimated physical environment condition, enable the displaying of the graphic display object according to the predefined display alignment in one of a first orientation and a second orientation, wherein in the first orientation the graphic display object is perceivable on the first panel side in the predefined display alignment and in the second orientation the graphic display object is perceivable on the second panel side in the predefined display alignment, and
adjust a respective light transmission to a predetermined individual degree for each of a plurality of predetermined primary subareas among the plurality of primary subareas, independent of each of a plurality of respective remaining primary subareas, according to at least one of the estimated physical environment condition or whether the graphic display object is to be displayed in the first orientation or the second orientation.

11. The vehicle according to claim 10, wherein
the physical environment condition includes a driving situation of the vehicle, when the driving situation of the vehicle is a motion phase of the vehicle, the control circuitry is configured to enable the displaying of the graphic display object according to the predefined display alignment in the first orientation such that a user disposed inside the vehicle is able to perceive the graphic display object in the predefined display alignment, and when the driving situation of the vehicle is a parking phase of the vehicle, the control circuitry is configured to enable the displaying of the graphic display object according to the predefined display alignment in the second orientation such that a person disposed outside the vehicle is able to perceive the graphic display object in the predefined display alignment.

12. The vehicle according to claim 10, further comprising a sensor to detect a presence of at least one of a user of the vehicle or a person, within a predefined threshold distance from the display device, and when the control circuitry receives a signal from the sensor indicating the presence of the at least one of the user of the vehicle or the person within the predefined threshold distance from the display device, the control circuitry is configured to enable the displaying of the graphic display object according to the predefined display alignment in the second orientation such that the graphic display object is perceivable in the predefined display alignment from outside the vehicle.

13. The vehicle according to claim 12, wherein
information represented by the graphic display object includes at least one of a predefined text message or a predefined graphic message.

14. The vehicle according to claim 13, wherein
the control circuitry is configured to receive information indicating an identity of the at least one of the user of the vehicle or the person within the predefined threshold distance from the display device, and the at least one of the predefined text message or the predefined graphic message includes a personal message customized according to the identity of the at least one of the user of the vehicle or the person within the predefined threshold distance from the display device.

15. The vehicle according to claim 10, wherein
information represented by the graphic display object includes a predefined parking time, and the graphic display object is displayed according to the predefined display alignment in the second orientation such that the predefined parking time is perceivable in the predefined display alignment from outside the vehicle.

16. The vehicle according to claim 10, wherein
the graphic display object augments a functionality of a head light and/or a blinker of the vehicle, and the graphic display object is displayed according to the predefined display alignment in the second orientation such that the graphic display object is perceivable in the predefined display alignment from outside the vehicle.

17. The vehicle according to claim 10, wherein
the primary space includes a plurality of primary spaces, the webbed structure is configured to attenuate light in each primary space of the plurality of primary spaces between each of the plurality of primary subareas, and the webbed structure includes an opaque material.

18. The vehicle according to claim 10, wherein
the plurality of secondary subareas are separated by a secondary space between each secondary subarea of the plurality of secondary subareas, and the control circuitry is configured to adjust a respective light transmission to a predetermined individual degree for each secondary subarea of a plurality of predetermined secondary subareas among the plurality of secondary subareas, independent of each secondary subarea of a plurality of respective remaining secondary subareas among the plurality of secondary subareas.

19. The vehicle according to claim 10, wherein
the plurality of primary subareas have a different shape than the plurality of secondary subareas, and the plurality of the secondary subareas are arranged to at least partially cover the primary space between each of the plurality of primary subareas.

20. The vehicle according to claim 10, wherein
the first layer includes a transparent screen with transparent organic light emitting diodes, and the second layer includes a polymer dispersed liquid crystal, a thin-film transistor screen, a dynamic scattered liquid crystal, or a suspended particle device.

* * * * *